(12) United States Patent
Harrison et al.

(10) Patent No.: US 6,428,033 B1
(45) Date of Patent: Aug. 6, 2002

(54) ASSISTIVE MOBILITY DEVICE

(75) Inventors: Richard J. Harrison, Hockessin, DE (US); William F. Mann, Avondale, PA (US)

(73) Assignee: R & W Ventures, INC, Hockessin, DE (US)

( * ) Notice: Subject to any disclaimer, the term of this patent is extended or adjusted under 35 U.S.C. 154(b) by 0 days.

(21) Appl. No.: 09/642,948

(22) Filed: Aug. 22, 2000

(51) Int. Cl.$^7$ ................................................ A47C 4/28
(52) U.S. Cl. ...................................... 280/644; 297/16.1
(58) Field of Search .............................. 280/642, 643, 280/644, 647, 649, 650, 87.05; 297/16.1, 16.2, 3, 94

(56) References Cited

U.S. PATENT DOCUMENTS

| | | | | |
|---|---|---|---|---|
| 4,052,087 A | * | 10/1977 | Gagliardi | 280/650 |
| 4,632,409 A | * | 12/1986 | Hall et al. | 280/643 |
| 4,685,725 A | * | 8/1987 | Helfrich | 297/16.1 |
| 5,076,390 A | * | 12/1991 | Haskins | |
| 5,560,636 A | * | 10/1996 | Chen | 280/642 |
| 5,568,933 A | * | 10/1996 | Mizuno | 280/650 |
| 5,741,020 A | * | 4/1998 | Harroun | 280/85.05 |
| 5,884,928 A | * | 3/1999 | Papac | |
| 5,890,760 A | * | 4/1999 | Kirstein | 297/219.11 |
| 5,984,406 A | * | 11/1999 | Lee | 297/16.1 |
| 6,027,132 A | * | 2/2000 | Robinson et al. | |
| 6,045,177 A | * | 4/2000 | Grace | 297/16.1 |
| 6,082,813 A | * | 7/2000 | Chen | 297/16.1 |
| 6,149,238 A | * | 11/2000 | Tsai | 297/16.1 |
| 6,155,641 A | * | 12/2000 | Frost | 297/3 |
| 6,209,951 B1 | * | 4/2001 | Han | 297/16.1 |
| 6,247,748 B1 | * | 6/2001 | Zheng | 297/16.1 |
| 6,247,749 B1 | * | 6/2001 | Yu | 297/16.1 |
| 6,264,271 B1 | * | 7/2001 | Munn et al. | 297/16.1 |

* cited by examiner

*Primary Examiner*—J. J. Swann
*Assistant Examiner*—Christopher Bottorff

(57) ABSTRACT

The present invention is a portable chair with caster wheels that is lightweight in construction and easily collapsed, carried, stored and transported by public or private means. The chair can be configured as an assistive mobility device to fill the unmet needs of aging healthy adults who wish to retain their independence and social interactions. It can also be configured as a collapsible office chair to meet the needs of employers with temporary working staff and for use by college students in crowded dorm rooms. Additional features such as an arm rest, a foot rest, or a reclining back are easily added during manufacture and because of the chairs uncomplicated design and duplicity of parts, it is very economical to manufacture.

14 Claims, 4 Drawing Sheets

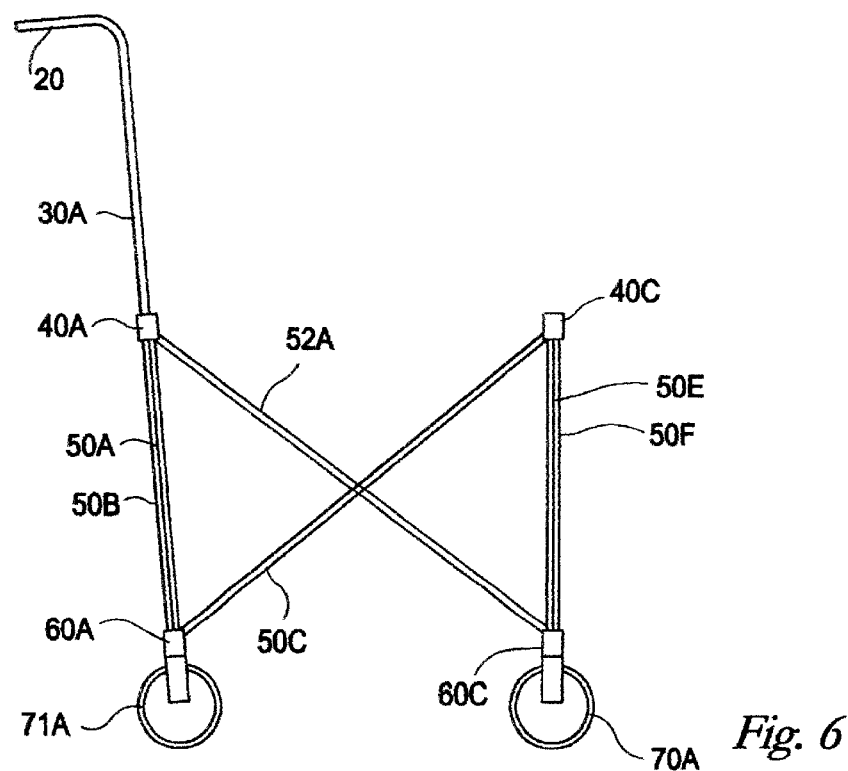
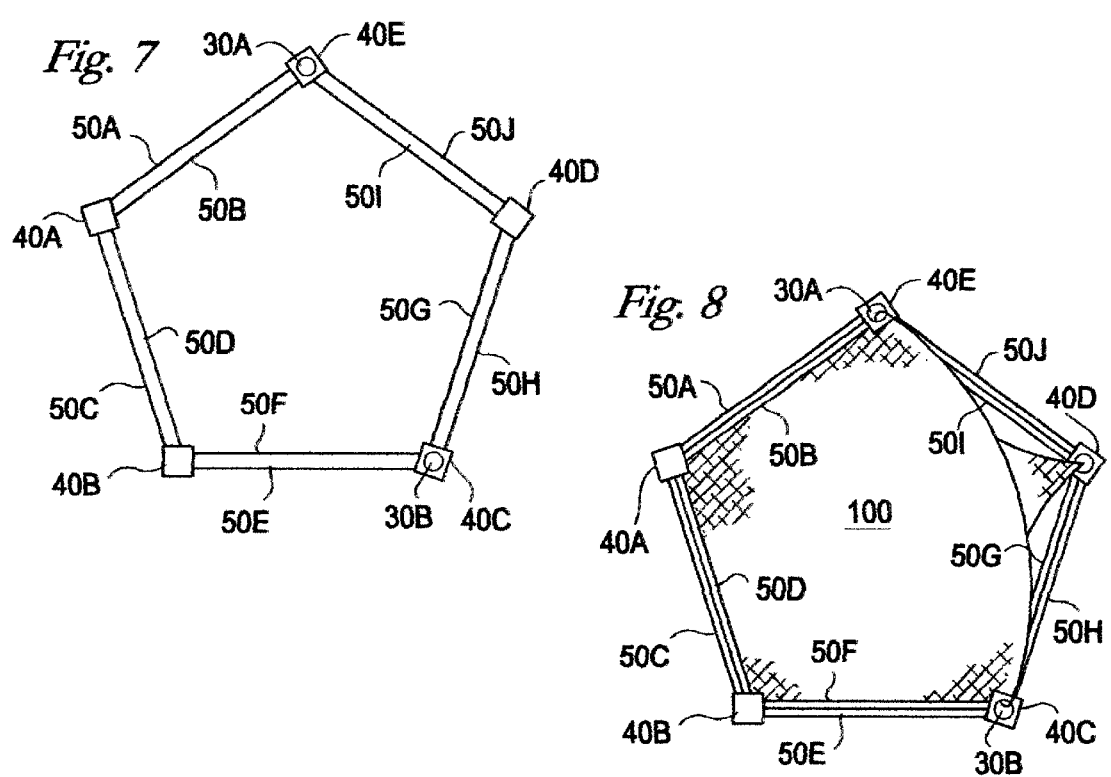

ASSISTIVE MOBILITY DEVICE

FIELD OF THE INVENTION

The present invention is a portable chair with wheels that is lightweight in construction and easily collapsed, carried, stored and transported by public or private means. The chair can be configured as an assistive mobility device to meet the needs of aging healthy adults or as a collapsible office chair. Moreover, the present invention is economical to manufacture due to its simplicity of materials, uncomplicated design and duplication of parts.

BACKGROUND OF THE INVENTION

Wheelchairs are a type of assistive mobility device. Traditionally, wheelchairs have been designed to facilitate patient transport for the medically infirmed. In meeting the needs of medical patients, the wheelchair has evolved into a classic styling which is easily recognized and most often associated with medically disabled or invalid patients. This easy recognition has created a stigma for those who use a wheelchair. Because of this stigma, many aging adults that would benefit from using a wheelchair limit their activities and social interactions rather Americans are living longer with life expectancy increasing annually (76.5 years for 1997 versus 76.1 years for 1996) according to the federal Center for Disease Control and Prevention. In addition, Americans 65 years and older represent the segment of U.S. population which is growing the fastest according to the U.S. Bureau of the Census. The impact this older adult segment will have on our healthcare system is inevitable in the future. So is the need and desire to extend the independence of older Americans.

Significant research has been conducted on older persons on the impact of reduced activities and social interactions on their wellness. These include studies by individual researchers and large scale studies such as the National Survey of Self Care and Aging, National Health Interview Survey, National Long-term Care Survey, and the Canadian Health and Activity Limitation Survey. The results of these studies provide conclusive proof that wellness and the quality of life of healthy older Americans is improved by extending their independence and social interactions.

Portable wheelchairs, a type of assistive mobility device, capable of folding or collapsing have been in use for many years to accommodate wheelchair users who travel and need to take their wheelchairs with them. Typically, the wheelchairs that are designed to fold or collapse incorporate a pair of diagonally extending cross members secured between a right and left frame member which may be scissored together to collapse the wheelchair. Standard cross member frame construction for portable wheelchairs is bulky and heavy, making transport or storage difficult at best. Consequently, portable wheelchairs are not designed for storage in standard carry-on luggage compartments such as on airlines, trains and other mass transit mediums. Other folding wheelchair designs such as those which fold around a center pole or those which fold with the backrest collapsing forward have the same problems.

Additionally, portable wheelchairs, although light versus a standard wheelchair, are heavy and awkward for older persons to lift and load into automotive vehicles such as cars, vans and taxis. U.S. Pat. No. 5,857,688 to Swearingen, U.S. Pat. No. 5,560,627 to Zatulovsky et al, U.S. Pat No. 4,861,056 to Duffey, Jr. et al, and U.S. Pat. No. 5,154,438 to Barclay are examples of prior art that incorporate various cross member support structures for a portable wheelchair.

The frame structure of the invention is prior art and well known in the seating industry. The frame structure has been used for many years by the manufacturer's of chairs for sporting events, camping, and fishing. Currently marketed examples of the frame structure include the folding Deluxe Quad Chair sold by Kmart Stores under the Northwest Territory brand name (bar code 72000752175—stock number 888072-113) and the Sir Edmund Hillary Folding Lounge Chair with footrest sold by Sears Roebuck & Company (bar code 27001728299—stock number 72829).

Therefore, there is a need in the art that appreciates the need of older adults who are not necessarily invalids to have an assistive mobility device which provides the means for easy participation in activities and social interactions without the wheelchair stigma. This specification describes an invention which will provide a mobility means that has the potential to extend the independence, quality of life and social interactions of the millions of aging Americans. Additionally, the present invention provides a solution to the needs for a lightweight, easily collapsible, portable, and storable assistive mobility device.

The invention also fills the unmet needs of another population of people, temporary office workers. Many employers today hire office workers for short periods of time. As the employers' space is often limited and the need for seating is temporary, the employer may use folding tables and chairs as a means of providing the temporary workers with a work space. Use of folding chairs avoids the investment in office chairs, which will be a storage problem when they are no longer required. Folding chairs do, however, have significant disadvantages to the employer and the temporary workers. Folding chairs are uncomfortable to sit on for extended periods of time and lack the mobility for which rolling office chairs were invented.

Therefore, there is a need in the art for which the present invention provides a solution while maintaining the easy storage associated with folding chairs.

SUMMARY OF THE INVENTION

Therefore, the object of the present invention is to present a compact, collapsible, assistive mobility device that provides the means for aging adults to participate in activities and social interactions without the wheelchair stigma. The invention accomplishes this by creating a new design appearance for an assistive mobility device. The design incorporates prior art from the frame of a chair originally designed as a camping backpacking or sports chair with the addition of caster wheels thus eliminating the large drive wheels and bulky frame normally associated with wheelchairs. Moreover, the preferred embodiment of the invention replaces the two traditional push handles with a collapsible push-bar which further strengthens the frame and alters the assistive mobility device's appearance. In addition, the typical wheelchair's two-piece fabric back and seat are replaced by a single piece of fabric in the preferred embodiment of the invention. This further alters the appearance of the assistive mobility device.

It is another object of the present invention to provide a new frame construction design. Whereas, most assistive mobility devices to date have collapsed by bringing the two opposing sides together, and a few have folded front to back or around a center pole. None have had a four-sided frame which simultaneously collapsed inwardly in both the front to back and side to side directions. This creates a significant advantage in the compact size which results when the assistive mobility device is collapsed.

It is yet another advantage of the present invention to provide a compact collapsible assistive mobility device that has a significant number of parts which are identical for economical construction. In the preferred embodiment of the invention at least six of the seat support arms, four upper corner brackets, two front caster wheels and associated corner brackets, two back caster wheels and associated corner brackets and two back rest supports are interchangeable. It is yet another advantage of the present invention to provide an adjustable footrest which is also collapsible.

It is yet another advantage of the present invention to provide an adjustable backrest.

In the preferred embodiment of the invention, the assistive mobility device has four removable casters wheels with the back caster wheels fixed to roll in the direction which the assistive mobility device faces and the front caster wheels free to rotate 360° for improved maneuverability. Moreover, the front caster wheels also have a brake to lock the assistive mobility device in a fixed location during the mounting and dismounting of the device.

It is yet another advantage of the present invention to provide a flexible carrying case for the assistive mobility device. In the preferred embodiment of the invention, the case has pockets for storage of the removable caster wheels and a shoulder strap for easy manual transport.

It is yet another advantage of the present invention to provide a collapsed assistive mobility device which will fit easily into the luggage compartment or storage areas of mass transit vehicles and the back seat or trunk of most automobiles. It is yet another advantage of the present invention to provide a mobile, comfortable and collapsible office chair.

These and further objects, features and advantages of the present invention will become apparent from the foregoing detailed description, wherein reference is made to figures and the accompanying drawings.

BRIEF DESCRIPTION OF THE DRAWINGS

FIG. 6 is a side view of the basic assistive mobility device frame with casters and an adjustable back shown in a slightly reclined position shown without a seat and back means 100.

FIG. 7 is a top view of a five-sided office chair frame using the assistive mobility device frame and caster invention concept. The chair is shown without a seat and back means.

FIG. 8 is a top view of a five-sided office chair frame with a seat and back means.

DETAIL DESCRIPTION OF THE INVENTION WITH PREFERRED EMBODIMENTS

Figure 1:
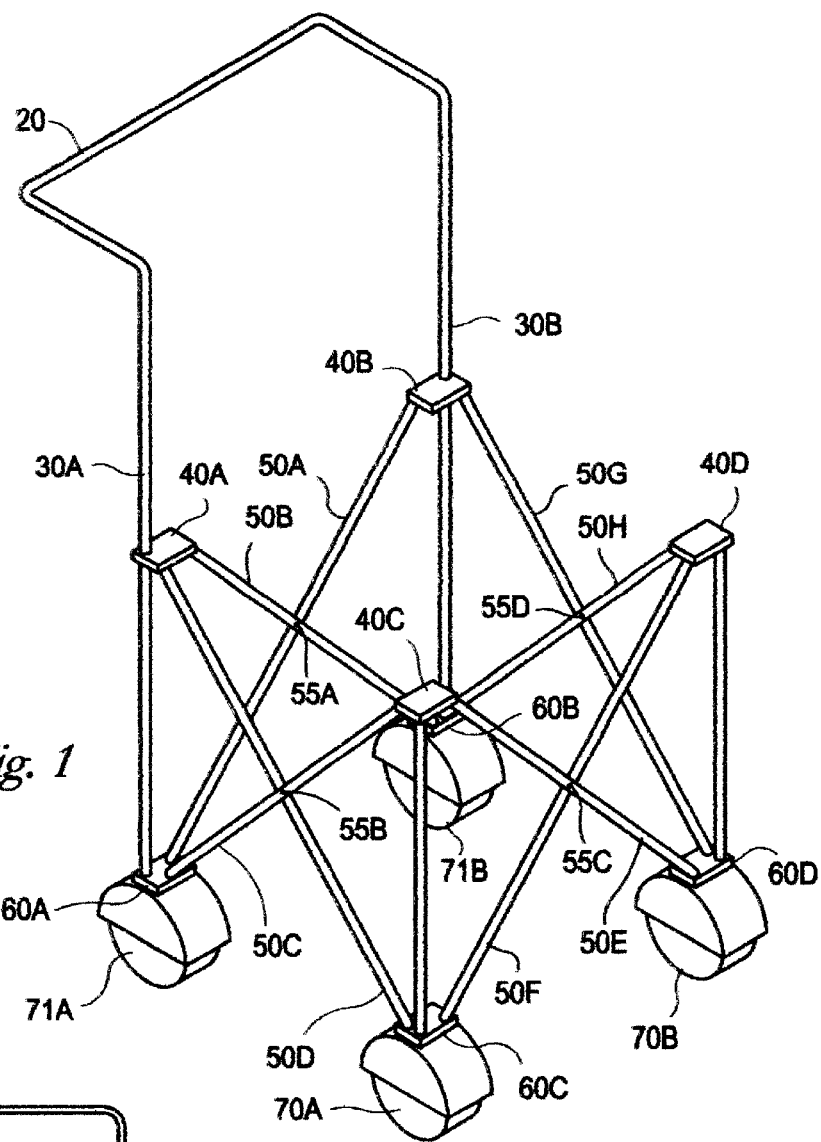
FIG. 1 is a prospective view of the basic assistive mobility device frame with casters 70A, 70B, 71A and 71B attached and without a seat and back means 100 illustrated.
Figure 2:
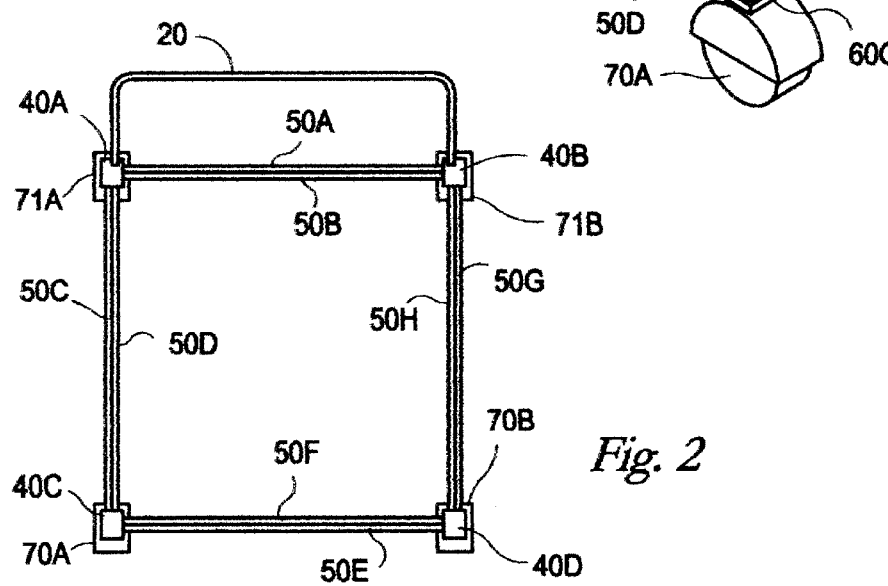
FIG. 2 is a top view of the basic assistive mobility device frame with casters 70A, 70B, 71A and 71B attached and without a seat and back means 100.
Figure 3:
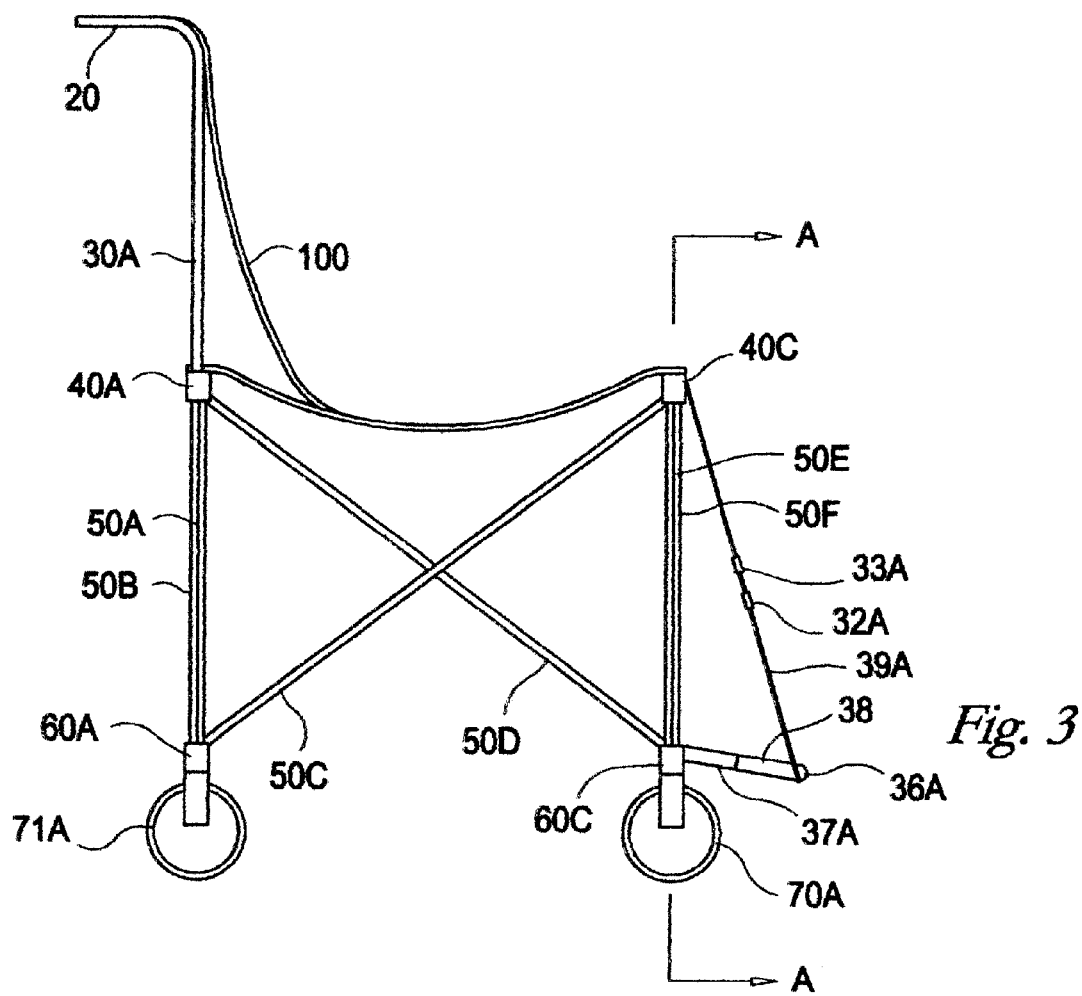
FIG. 3 is a side view of the basic assistive mobility device frame in its normally open position with a seat and back means.

Referring now to the drawings, it is seen that the preferred embodiment of the assistive mobility device of the present invention, as illustrated in FIG. 1 and FIG. 2 without a seat and back means is comprised of a four-sided frame having two (2) seat support arms 50 per side, four (4) upper corner brackets 40A, 40B, 40C, and 40D, four (4) lower corner brackets 60A, 60B, 60C and 60D, two (2) vertical back rest posts 30A and 30B, a push bar 20, and four (4) removable casters 70A, 70B, 71A and 71B. FIG. 3 is side view of the preferred embodiment with a flexible one piece backrest and seat means 100 shown. The backrest and seat means 100 are attached to the upper corner brackets 40A, 40B, 40C and 40D and to the back rest posts 30A and 30B. The vertical back rest posts 30A and 30B are secured to the rear lower corner brackets 60A and 60B and slide freely through the upper rear corner brackets 40A and 40B as the assistive mobility device is opened and closed.

In the preferred embodiment of the invention the front casters 70A and 70B can rotate 360°. They are attached to the lower support arm corner brackets 60C and 60D so as to be easily removable when the assistive mobility device is compacted for transit. The rear casters 71A and 71B are locked in a position allowing for movement in the direction the assistive device is facing. An optional caster locking brake, not shown, is located on each caster 70A and 70B.

Figure 4:
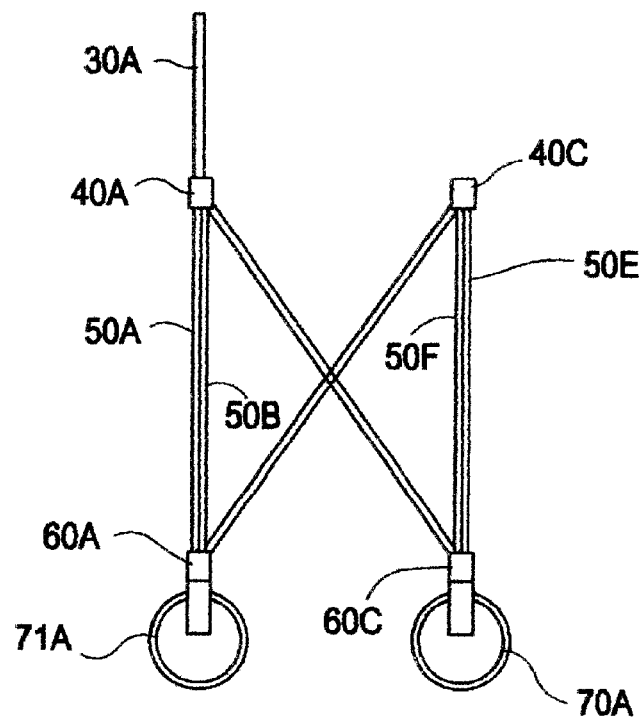
FIG. 4 is a side view of the basic assistive mobility device frame in a partially closed position without a push bar 20 and seat and back means 100.

In the preferred embodiment of the invention, the length of the seat support arms 50A, 50B, 50C, 50D, 50E, 50F,50G, and 50H between the upper seat support arm brackets 40A, 40B, 40C, and 40D and the opposing lower seat arm support brackets 60A, 60B, 60C, and 60D is the same. In the preferred embodiment of the invention the seat support arms 50A and 50B, 50C and 50D, 50E and 50F, and 50G and 50H bisect each other forming a symmetrical frame. Seat support arms 50A and 50B, 50C and 50D, 50E and 50F, and 50G and 50H on each side of the fame are joined at the point of intersection with a swivel fitting or pin 55A, 55B,55C and 55D which permits the seat support arms 50A and 50B, 50C and 50D, 50E and 50F, and 50G and 50H to move from an essentially parallel position when the assistive mobility device is closed, to a crossed position when in the open or sitting position. In addition, one end of each seat support arm is connected to an upper corner bracket 40A, 40B, 40C, and 40D by a swivel fitting and the opposite end of each arm is connected to a lower corner bracket by a swivel fitting. FIG. 4 illustrates a side view of the assistive mobility device frame in a partially closed position without push bar 20 and seat and back means 100.

Figure 5:
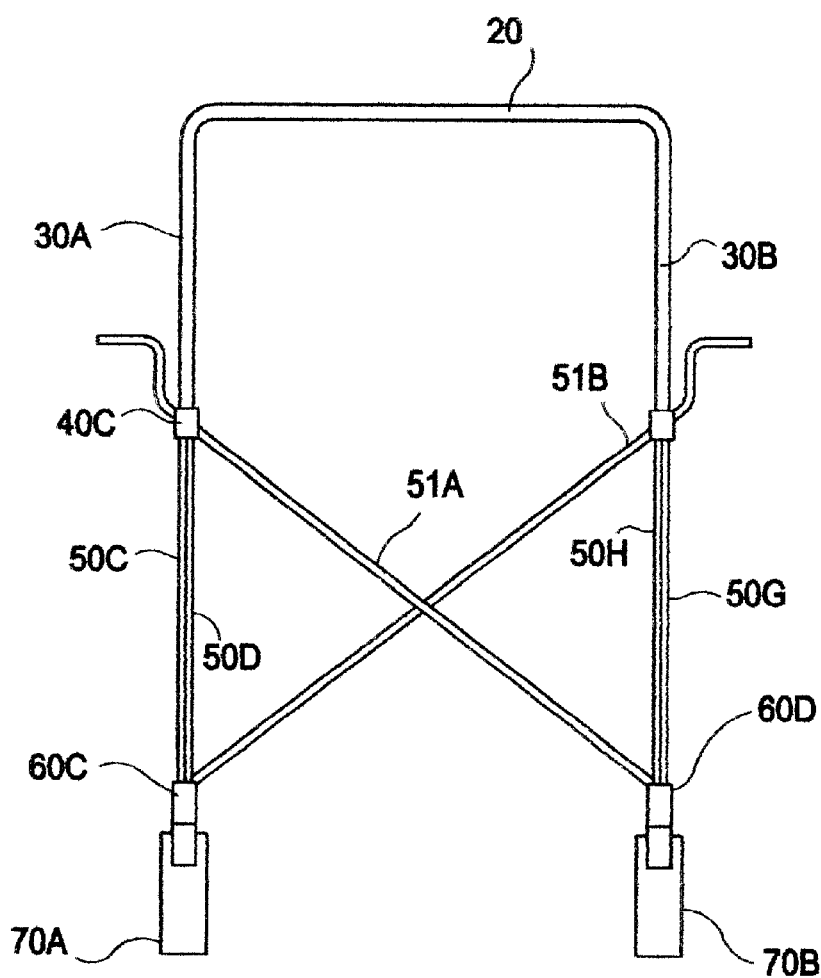
FIG. 5 is a front view of the assistive mobility device frame with casters and extended front seat support arm use to create an armrest frame shown without a seat and back means.

In another version of the invention, the front two seat support arms 50E and 50F which extend across the front of the frame from the lower front corner brackets 60C and 60D to the upper front brackets 40C and 40D are replaced by two seat support arms 51A and 51B which extend above the upper front corner brackets 40C and 40D. The extensions of these two seat support arms 51A and 51B are bent above the upper corner brackets 40C and 40D to form the support frame for the armrests, as illustrated in FIG. 5. The armrest is created by a flexible fabric material which is attached or mounted on the seat support arm 51A and 51B and extends toward the back of the chair to form an essentially horizontal armrest for the assistive mobility device occupant.

In the preferred embodiment of the invention, the assistive mobility device has a removable push bar 20 which mounts on the two backrest support arms 30A and 31B. The push bar 20 has a fixed width which provides additional frame stability versus individual handles when the assistive mobility device is in its seating configuration.

Figure 3A:
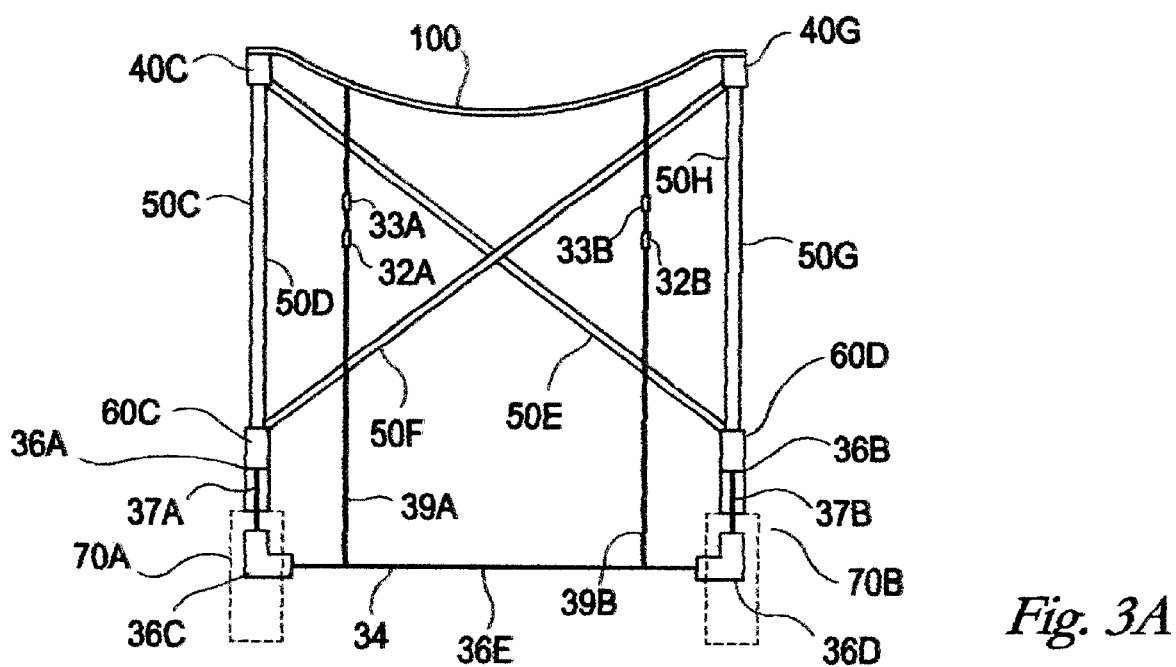
FIG. 3A is a cross section A—A in FIG. 3.

In the preferred embodiment of the invention, as shown in FIGS. 3 and 3A, the assistive mobility device also has an adjustable foot or leg rest 38 which comprise two telescoping hinged leg rest support arms 37A and 37B extending away from the front lower corner brackets 60C and 60D. The hinges are 36A and 36B. The outward ends of the leg rest support arms 37A and 37B are attached through hinges 36C and 36D to a leg rest support cross member 34. The leg rest support cross member 34 is also hinged in the middle as at 36E thus allowing the two leg rest support arms 37A and 37B and the leg rest support cross member 34 to become essentially parallel when the assistive mobility device is closed.

The foot/leg rest is held at the desired height off the ground by a pair of support straps 39A and 39B which are attached to the seat and back rest means 100 and to the foot rest cross member 34. Said support straps 39A and 39B have a means 32A and 32B for shortening or lengthening and a means for disconnecting 33A and 33B and connecting. Such means may be of any suitable type, including buckles, Velcro straps. By adjusting the length of the telescoping leg rest support arms 37A and 37B and the length of the support straps 39A and 39B, the assistive mobility device can be configured to comfortably fit different size occupants. The ability to disconnect the support straps 39A and 39B permits easy chair access.

In yet another configuration of the assistive mobility device, the seat support arms 50D and 50G which extend from the lower front left and right lower corner brackets 60C and 60D to their respective upper left and right corner brackets 40A and 40B are replaced with locking telescoping seat support arm brackets 52A and 52B.

Thus by extending or shorting the length of the telescoping seat support arms 52A and 52B, one can change the back rest angle for the occupant. This is illustrated in FIG. 6.

In the preferred embodiment of the invention the frame is made using a lightweight material such as aluminum, a high-strength composite, or an engineering grade of plastic. The footrest support straps are made of a nylon web belting having a quick-release buckle and the combination seat and back means 100 are made of a strong flexible material such as a durable, high-strength, nylon canvas fabric. In the preferred embodiment of the invention, the assistive mobility device also includes a flexible carrying case. The case includes pockets for the casters and a shoulder strap.

In yet another configuration of the previously described invention, the handle bars or push bars 20 are removed from the backrest supports 30A and 30B thus creating a chair which now fulfills the function of a collapsible, rolling office chair. To match current office industry design practices and improved the chairs stability in the office environment an additional set of seat support arms 50I and 50J and the associated corner brackets 40E and 60E and caster are added to make a five sided frame. A top view of the five-sided frame is illustrated in FIG. 7. The five sided frame also collapses in a similar operation to form a very compact unit for storage. The preferred placement of back rest supports 30A and 30B is illustrated in FIG. 8. The office chair can, however, be made with a point of the chair being centered in the front of the seat (not illustrated). As with the assistive mobility device, arm rests (not shown) can be added to the device in a similar manor. From the foregoing, it will be seen that the invention is well adapted to accomplish all of the ends and objectives herein and above set forth, together with other advantages which are obvious and inherent to the apparatus and structure. It will be understood that certain features and subcombinations are of utility and may be employed without reference to other features and subcombinations. This is contemplated by and is within the scope of the claims. Because many possible embodiments may be made of the invention without departing from the scope hereof, it is to be understood that all matters set forth and shown in accompanied drawings are to be interpreted as illustrative only and not to in a limiting sense.

What is claimed is:

1. A five-sided collapsible chair frame assembly comprising:
   i) Five frame sides each comprising two pivotally connected intersecting support members per side;
   ii) said frame assembly including five upper brackets and five lower brackets;
   iii) one end of each support member connected to a lower bracket and the other end of each support member is connected to an upper bracket, wherein the lower end of each support member is connected to a lower bracket that also connects the lower end of the adjacent support member and the upper end of each support member is connected to an upper bracket that also connects the upper end of the adjacent support member, whereby a five-sided collapsible connected frame is formed.

2. The invention of claim 1 including means for a backrest support.

3. The invention of claim 2 wherein said backrest support comprises vertical posts, each post having one end connected to a lower bracket and its opposite end passing vertically through its associated upper bracket.

4. The invention of claim 1 further including a seat and backrest means attached to the frame for supporting a person.

5. The invention of claim 1 further including means for providing armrests.

6. The invention of claim 1 further including wheels extending below each lower corner bracket.

7. The invention of claim 1 wherein the frame includes a rear side and first and second front sides.

8. The invention of claim 1 wherein the frame includes a front side and first and second rear sides.

9. A five-sided collapsible chair frame assembly comprising:
   i) Frame connecting brackets for connecting said frame; and further including:
   ii) Five frame sides each comprising two pivotally connected intersecting seat support members per side;
   iii) One end of each support member connected to a lower corner bracket and the other end of each support member connected to an upper corner bracket, wherein the lower end of each support member is connected to a lower bracket that also connects the lower end of the adjacent support member and the upper end of each support member is connected to an upper corner bracket that also connects the upper end of the adjacent support member, whereby a five-sided connected frame is formed;
   iv) Said frame assembly including a left side and a right side opposite the left side;
   v) said left side further including a backrest frame support element, one end connected to the lower rear bracket of said left side and passing through the upper rear left side bracket; and said right side backrest fame support element, one end connected to the lower rear bracket of the right side and passing through the upper rear right side bracket; said backrest frame elements extending vertically from said lower brackets through said upper brackets.

10. The invention of claim 9 wherein the frame includes a rear side and first and second front sides.

11. The invention of claim 9 wherein the frame includes a front side and first and second rear sides.

12. The invention of claim 9 further including a seat and backrest attached to the frame for supporting a person.

13. The invention of claim 9 further including means for providing armrests.

14. The invention of claim 9 further including wheels extending below each lower corner bracket.

* * * * *